UNITED STATES PATENT OFFICE 2,249,774

AZO COMPOUND AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application July 24, 1940, Serial No. 347,218

18 Claims. (Cl. 260—155)

This invention relates to new azo compounds and their application to the art of coloring. More particularly it relates to nuclear non-sulfonated azo dye compounds which are particularly advantageous for the coloration of organic derivatives of cellulose especially cellulose acetate silk. Coloration may be effected by dyeing, printing, stenciling or like methods.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

It is an object of our invention to provide a new class of azo compounds which, depending upon their particular structure, are suitable for the coloration of organic derivatives of cellulose, wool, silk, cotton and viscose. A particular object is to provide a process for the coloration of organic derivatives of cellulose, wool, silk, cotton and viscose. A further object is to provide colored organic derivatives of cellulose, wool, silk, cotton and viscose textile materials which are of good fastness to light and washing. Other objects will hereinafter appear.

The azo compounds by means of which the above objects are accomplished or made possible have the general formula:

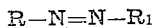

wherein R represents the residue of a member selected from the group consisting of an aryl nucleus of the benzene series and an aryl nucleus of the naphthalene series, $R_1$ represents the residue of a tetrahydroquinoline nucleus containing an acylamino group in a position selected from the group consisting of the 5 and 7 positions and wherein said tetrahydroquinoline nucleus is joined through its 6 position to the azo bond shown.

While our invention relates broadly to the azo compounds having the above general formula, it relates more particularly to those having the general formula:

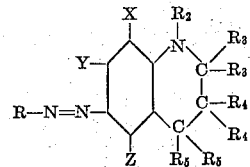

wherein R represents a member selected from the group consisting of an aryl nucleus of the benzene series and an aryl nucleus of the naphthalene series, $R_2$ represents a member selected from the group consisting of hydrogen, an alkyl group, a short chain unsaturated hydrocarbon group, a cycloalkyl group, a phenyl group and a furyl group, $R_3$, $R_4$ and $R_5$ each represents a member selected from the group consisting of hydrogen, an alkyl group, an alkoxy group and a hydroxy group, Y represents a member selected from the group consisting of hydrogen and an acylamino group, X and Z each represents a member selected from the group consisting of hydrogen, a halogen atom, a hydroxy group, an alkyl group, an alkoxy group and an amino group and wherein at least one of the members Y and Z must be an acylamino group.

Compounds wherein R represents a nuclear non-sulfonated aryl nucleus of the benzene series containing but one benzene ring have been found to be generally advantageous, particularly for the coloration of organic derivatives of cellulose. Compounds wherein $R_2$ is a hydroxyalkyl group likewise have been found to be generally advantageous. Ordinarily the acylamino group which must be present in either the 5 or 7 position of the tetrahydroquinoline nucleus is an acetylamino group.

The azo compounds of our invention which contain no nuclear sulfonic acid group constitute a valuable class of compounds for the coloration of organic derivatives of cellulose, especially cellulose acetate silk. We would here note that when our compounds are to be employed to color such materials that it is generally advantageous that they contain no nuclear carboxylic acid group. The compounds just mentioned likewise possess some utility for the dyeing of wool and silk. The nuclear sulfonated compounds of our invention possess little or no utility for the coloration of organic derivatives of cellulose but can be employed to color silk, wool, viscose and cotton.

The colorations obtained in accordance with our invention are generally of excellent fastness to light and washing. Further, by means of the compounds of our invention, blue dyeings on cellulose acetate silk textile material of good fastness to light and washing and of good dischargeability can be obtained. This latter advantage is of considerable importance because prior attempts to provide azo dyes which color cellulose acetate silk desirable blue shades of good fastness to light and washing and which possess good dischargeability have not been particularly successful, and accordingly there is a real need for such dyes in the art. In addition to the foregoing advantages, the dye compounds of our invention likewise possess excellent affinity for cellulose acetate silk dyeing this material rapidly at temperatures as low as 60–65° C.

The azo compounds of our invention can be prepared by diazotizing a primary arylamine of the benzene or naphthalene series and coupling the diazonium compound obtained with a tetrahydroquinoline coupling compound containing an acylamino group in at least one of the positions numbered 5 or 7. Both the 5 and 7 positions of the tetrahydroquinoline nucleus can be substituted at the same time with the same or different acylamino groups but, in accordance with our invention, at least one of these positions must be substituted. Further since coupling occurs in the 6 position of the tetrahydroquinoline nucleus this position should not be blocked and no group should be present which would prevent coupling in this position.

For purposes of clarity a number of terms are defined and illustrated hereinafter. It will be understood that these terms, as used herein and in the claims, unless otherwise indicated, have the meaning assigned to them. The term "alkyl" includes not only unsubstituted alkyl groups such as a methyl group, an ethyl group, a propyl group, or a butyl group, but also substituted alkyl groups such as β-hydroxyethyl, β-hydroxypropyl, β,γ-hydroxypropyl, γ-hydroxypropyl, β-methoxyethyl, β-ethoxyethyl, β-chloroethyl, β-sulfoethyl, β-sulfopropyl, γ-sulfopropyl, β-sulfatoethyl, β-cyanoethyl, γ-cyanopropyl, β-sulfatopropyl, γ-sulfatopropyl and hydroxyalkyl groups esterified to an acid ester of an acid of phosphorus such as β-phosphatoethyl, γ-phosphatoethyl, and β-phosphitoethyl.

The expression "a furyl group" includes not only the furyl group itself but also furyl derivatives such as 5-methylfuryl, 5-ethylfuryl, 5-β-hydroxyethylfuryl, 5-γ-hydroxypropyl-furyl, tetrahydrofuryl, 5 - methyltetrahydrofuryl,5-ethyltetrahydrofuryl, 5 - β - hydroxyethyltetrahydrofuryl and 5 - γ - hydroxypropyltetrahydrofuryl. Similarly, the expression "a phenyl nucleus" includes not only the phenyl nucleus but also phenyl nuclei substituted with substituents such as a nitro group, a halogen atom, an alkyl group, a hydroxy group or an alkoxy group.

The term "alkoxy" includes, for example, methoxy, ethoxy, propoxy, butoxy, β-methoxyethxy and β-ethoxyethoxy. Illustrative cycloalkyl groups include cyclobutyl, cyclohexyl and cycloheptyl.

Further, the term "amino" includes the unsubstituted amino group as well as substituted amino groups such as alkylamino, furylamino, aralkylamino, phenylamino and cycloalkylamino. Illustrative of such substituted amino groups may be mentioned, methylamino, ethylamino, butylamino, glycerylamino, di-ethylamino, isopropylamino, methylethylamino, tetrahydrofurfurylamino, furfurylamino, benzylamino, mono-phenylethylamino, phenylamino, 4' - ethoxyphenylamino, 2'-methylphenylamino, cyclohexylamino, cycloheptylamino, β-methoxyethylamino, β-sulfoethylamino, β-sulfatoethylamino, β - hydroxyethylamino, γ-hydroxypropylamino, and ethyl, β-hydroxyethyl-amino.

Similarly, the term "acyl" includes acyl groups such as formyl, acetyl, butyryl, oleyl, benzoyl, furoyl, propionyl,

and

Illustrative short chain unsaturated hydrocarbon groups include,

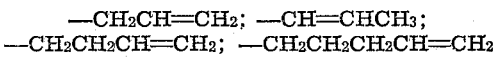

The following examples illustrate the preparation of the azo compounds of our invention:

*Example 1*

1 gram mole of p-aminoacetophenone is diazotized in known fashion and the diazonium compound obtained is added to a cold dilute hydrochloric acid solution of 7-acetylaminotetrahydroquinoline. The coupling reaction which takes place upon the addition of the diazonium compound is conducted while maintaining the reaction temperature at about 0–10° C. with stirring of the reaction mixture. The colpling reaction is completed by the addition of an aqueous solution of sodium acetate until the reaction mixture is no longer acid to Congo-red paper. The dye compound formed is recovered by filtration, washed with water and dried. The dye compound thus obtained colors cellulose acetate silk orange.

By the substitution of an equivalent gram molecular weight of 7-acetylamino-1-allyltetrahydroquinoline, 7-acetylamino-3-methoxytetrahydroquinoline and 5-acetylamino-1-tetrahydrofurfuryltetrahydroquinoline, for example, for the 7-acetylaminotetrahydroquinoline of the example dye compounds of our invention which similarly color cellulose acetate silk orange can be obtained.

*Example 2*

1 gram mole of p-nitroaniline is diazotized in known fashion and the diazonium compound obtained is coupled with 1 gram mole of 7-formylamino - 1 - β - hydroxyethyltetrahydroquinoline. Coupling and recovery of the dye compound formed can be carried out in accordance with the general method described in Example 1. The dye compound obtained colors cellulose acetate silk rubine.

By the substitution of an equivalent gram molecular weight of 7-acetylamino-1-phenyltetrahydroquinoline, 7-acetylamino-3-methyltetrahydroquinoline and 7-acetylamino-5-chlorotetrahydroquinoline, for example, for the coupling component of the example dye compounds of our invention can be obtained.

*Example 3*

1 gram mole of p-nitro-o-fluoroaniline is diazotized in known fashion and the diazonium compound obtained is coupled with one gram mole of 5-propionylamino-1-glyceryltetrahydroquinoline. Coupling and recovery of the dye compound formed can be carried out in accordance with the general procedure set forth in Example 1. The dye compound obtained colors cellulose acetate silk rubine.

By the substitution of an equivalent gram molecular weight of 5-propionylamino-3-hydroxytetrahydroquinoline, 5 - formylamino - 3 - methoxytetrahydroquinoline and 5-acetylamino-8-chlorotetrahydroquinoline, for example, for the coupling component of the example dye compounds of our invention which similarly colors cellulose acetate silk rubine shades can be obtained.

*Example 4*

1 gram mole of p-nitro-o-chloroaniline is diazotized and the diazonium compound obtained is coupled with one gram more of 7-lactylamino-1-methyltetrahydroquinoline. Coupling and recovery of the dye compound formed can be carried out in accordance with the general procedure described in Example 1. The dye compound obtained colors cellulose acetate silk rubine.

By the substitution of an equivalent gram molecular weight of 7-acetylamino-1-methyl-8-ethoxytetrahydroquinoline and 7-acetylamino-4-ethyltetrahydroquinoline, for example, for the coupling component of the example dye compounds of our invention which color cellulose acetate silk rubine can be obtained.

*Example 5*

1 gram mole of p-nitro-o-bromoaniline is diazotized and the diazonium compound obtained is coupled with one gram mole of 7-methyl-5-butyrylamino-1-β-sulfoethyltetrahydroquinoline. Coupling and recovery of the dye compound formed can be carried out by methods known to those skilled in the art. The dye compound obtained colors cellulose acetate silk, wool and silk rubine shades.

By the substitution of an equivalent gram molecular weight of 5-acetylamino-7-acetylaminotetrahydroquinoline, 7-acetylamino-4-hydroxytetrahydroquinoline and 7-acetylamino-5-methoxytetrahydroquinoline, for example, for the coupling component of the example dye compounds of our invention are obtained which color cellulose acetate silk, wool and silk rubine shades.

*Example 6*

1 gram mole of p-nitro-o-hydroxyaniline is diazotized and the diazonium compound obtained is coupled with one gram mole of 7-tetrahydrofuroylamino-1-β-hydroxypropyletetrahydroquinoline. Coupling and recovery of the dye compound formed can be carried out in accordance with the general procedure set forth in Example 1. The dye compound obtained colors cellulose acetate silk, wool and silk pinkish-rubine shades.

By the substitution of an equivalent gram molecular weight of 7-acetylamino-5-hydroxytetrahydroquinoline, 5-acetylamino-8-aminotetrahydroquinoline and 7-acetylamino-5-aminotetrahydroquinoline, for example, for the coupling component of the example dye compounds of our invention which color cellulose acetate silk, wool and silk can be obtained.

*Example 7*

1 gram mole of 1-amino-2,4-dinitrobenzene is diazotized and the diazonium compound obtained is coupled with one gram mole of

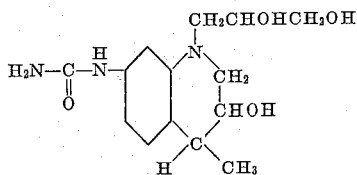

The dye compound obtained colors cellulose acetate silk purplish-violet shades.

By the substitution of an equivalent gram molecular weight of

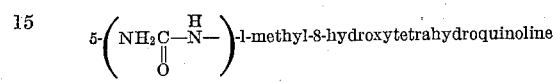

for the coupling component of the example a dye compound of our invention which colors cellulose acetate silk, wool and silk can be obtained.

*Example 8*

1 gram mole of 1-amino-2,4-dinitro-6-chloroaniline is diazotized and the diazonium compound obtained is coupled with one gram mole of

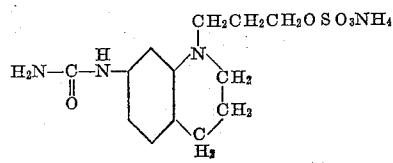

The dye compound obtained colors cellulose acetate silk, wool and silk blue.

By the substitution of an equivalent gram molecular weight of 1-amino-2,4-dinitro-6-(F, Br, I)-benzene, 1-amino-2,4-dinitro-6-methoxybenzene, 1-amino-2,4-dinitro-6-hydroxybenzene, 2-amino-3,5-dinitrophenylmethylketone, 2-amino-3,5-dinitrophenylmethylketone, 2-amino-3,5-dinitrophenylmethyl-sulfone, and 2-amino-3,5-dinitrobenzoic acid in its ester or amide forms for the diazonium compound of the example dye compounds of our invention which color cellulose acetate silk, wool and silk can be obtained.

*Example 9*

1 gram mole of 1-amino-2,4-dinitro-6-sulfonethylamidebenzene is diazotized and the diazonium compound obtained is coupled with one gram mole of 1-β-hydroxyethyl-5-acetylamino tetrahydroquinoline. The dye compound obtained colors cellulose acetate silk greenish-blue.

By the substitution of 1 gram mole of 1-β-hydroxypropyl-3-hydroxy-7-acetylamino tetrahydroquinoline for 1-β-hydroxyethyl-5-acetylamino tetrahydroquinoline a dye compound is obtained which colors cellulose acetate silk greenish-blue.

*Example 10*

1 gram mole of 1-amino-2,4-dinitro-6-chlorobenzene is diazotized and the diazonium compound obtained is coupled with 1 gram mole of β,γ-dihydroxypropyl-5-acetylamino tetrahydroquinoline. The dye compound obtained colors cellulose acetate silk blue.

By the substitution of an equivalent gram molecular weight of 1-amino-2-methyl-4-nitrobenzene, 1-amino-2-sulfonamide-4-nitrobenzene, 1-amino-2-ethylsulfone-4-nitrobenzene and 1-amino-2-carboxyethyl-4-nitrobenzene for the 1-amino-2,4-dinitro-6-chlorobenzene of the example dye compounds which color cellulose acetate silk are similarly obtained.

The following tabulation further illustrates the compounds included within the scope of our invention together with the colors they yield on the materials which they are adapted to color. The compounds indicated below can be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 10 inclusive.

thylamine-3-sulfonic acid, 1-naphthylamine-5-sulfonic acid, 1-naphthylamine-6-sulfonic acid, 1-naphthylamine-4,8-disulfonic acid, 1-naphthylamine-3,8-disulfonic acid, metanilic acid, 1-amino-2,4-disulfonic benzene and 1-amino-2-chloro-4-sulfonic benzene.

It should be here noted that the nuclear non-sulfonated compounds of our invention yield generally similar shades on other organic derivatives of cellulose, wool and silk (i. e. when adapted to color these latter two materials) as they do on cellulose acetate silk.

The coupling compounds employed in the preparation of the azo compounds of our invention can be prepared from 5-nitro and 7-nitro-tetra-

| | Amine | Coupling component | |
|---|---|---|---|
| 9 | p-Aminoazobenzene | [structure] | Colors cellulose acetate silk red. |
| 10 | p-Nitroaniline-o-sulfonic acid | [structure] | Colors silk and wool violet. |
| 11 | Dianisidine disulfonic acid | [structure] (2 moles) | Colors silk wool, cotton and viscose red. |
| 12 | 1-amino-2,4-dinitro-6-sulfonic acid | [structure] | Colors cotton, silk, wool and viscose blue. |
| 13 | 1-amino-5-naphthol-7-sulfonic acid | [structure] | Colors silk and wool blue. |

Although a considerable number of examples of dye compounds have been given, it is to be understood that these examples are illustrative and not limitative of our invention. Any of the diazo components shown herein, for example, can be coupled with any of the coupling components shown to give compounds included within the scope of our invention. Other amines which can be diazotized and the diazonium compounds obtained coupled with coupling components of our invention include, for example, 1-amino-2-cyano-4-nitrobenzene, 2-amino-6-methoxybenzoxazole, 2-amino-6-methoxybenzothiazole, 1-amino-2,4-dinitro-6-cyanobenzene, α-naphthylamine, 1-amino-2,4-dinitronaphthalene, p-sulfanilic acid, 1-amino-4-sulfonic naphthalene, 2-naphthylamine-8-sulfonic acid, 1-naphhydroquinoline compounds. 5-nitroquinolines can be prepared as described in Journal Chemical Society, vol. 61, pages 782 and 783 and Journal Praktische Chemie, vol. 63, pages 573–576 (1901). By hydrogenation of 5-nitroquinoline compounds 5-nitrotetrahydroquinoline compounds can be obtained. Hydrogenation can be effected by reaction with hydrogen under pressure in a pressure reaction vessel in the presence of a catalyst such as Raney nickel. 7-nitrotetrahydroquinoline can be prepared as described in Berichte der Deutschen Chemischen Gesellschaft, vol. 46, pages 3173 and 3174. From the 5-nitro- and 7-nitrotetrahydroquinoline compounds the corresponding 5-amino- and 7-amino-tetrahydroquinoline compounds can be prepared by reduction of the nitro groups in accordance with known reduction methods. Coupling components of our invention can be prepared from the 5-amino- and 7-amino-tetrahydroquinoline compounds by acylation of the amino groups by methods customarily employed for the acylation of an amino group.

From the foregoing it is believed that the preparation of the coupling components used in the preparation of the azo compounds of our invention will be apparent to those skilled in the art. It will be understood that the manner of preparing the coupling components does not constitute a part of our invention and that these compounds can be prepared in any suitable manner. The various substituents which can be present on the tetrahydroquinoline nucleus can be introduced by methods known for the introduction of such substituents and, accordingly, it is not believed necessary to specifically describe just how they can be introduced.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. An azo compound having the general formula: R—N=N—R₁ wherein R represents the residue of a member selected from the group consisting of an aryl nucleus of the benzene series and an aryl nucleus of the naphthalene series, R₁ represents the residue of a tetrahydroquinoline nucleus containing an acylamino group in a position selected from the group consisting of the 5 and 7 positions and wherein said tetrahydroquinoline nucleus is joined through its 6 position to the azo bond shown.

2. An azo compound having the general formula: R—N=N—R₁ wherein R represents the residue of a member selected from the group consisting of an aryl nucleus of the benzene series and an aryl nucleus of the naphthalene series, R₁ represents the residue of a tetrahydroquinoline nucleus containing an acetylamino group in a position selected from the group consisting of the 5 and 7 positions and wherein said tetrahydroquinoline nucleus is joined through its 6 position to the azo bond shown.

3. A monoazo compound having the general formula: R—N=N—R₁ wherein R represents the residue of an aryl nucleus of the benzene series containing but one benzene ring, R₁ represents the residue of a tetrahydroquinoline nucleus containing an acylamino group in the 5 position and wherein said tetrahydroquinoline nucleus is joined through its 6 position to the azo bond shown.

4. A monoazo compound having the general formula: R—N=N—R₁ wherein R represents the residue of an aryl nucleus of the benzene series containing but one benzene ring, R₁ represents the residue of a tetrahydroquinoline nucleus containing an acylamino group in the 7 position and wherein said tetrahydroquinoline nucleus is joined through its 6 position to the azo bond shown.

5. An azo compound having the general formula:

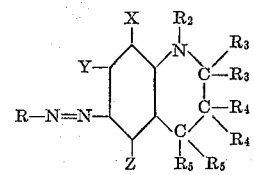

wherein R represents a member selected from the group consisting of an aryl nucleus of the benzene series and an aryl nucleus of the naphthalene series, R₂ represents a member selected from the group consisting of hydrogen, an alkyl group, a short chain unsaturated hydrocarbon group, a cycloalkyl group, a phenyl group and a furyl group, R₃, R₄ and R₅ each represents a member selected grom the group consisting of hydrogen, an alkyl group, an alkoxy group and a hydroxy group, Y represents a member selected from the group consisting of hydrogen and an acylamino group, X and Z each represents a member selected from the group consisting of hydrogen, a halogen atom, a hydroxy group, an alkyl group, an alkoxy group and an amino group and wherein at least one of the members Y and Z must be an acylamino group.

6. A nuclear non-sulfonated azo compound having the general formula:

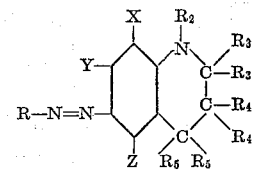

wherein R represents an aryl nucleus of the benzene series containing but one benzene ring, R₂ represents a member selected from the group consisting of hydrogen, an alkyl group, a short chain unsaturated hydrocarbon group, a cycloalkyl group, a phenyl group and a furyl group, R₃, R₄ and R₅ each represents a member selected from the group consisting of hydrogen, an alkyl group, an alkoxy group and a hydroxy group, Y represents a member selected from the group consisting of hydrogen and an acylamino group, X and Z each represents a member selected from the group consisting of hydrogen, a halogen atom, a hydroxy group, an alkyl group, an alkoxy group and an amino group and wherein at least one of the members Y and Z must be an acylamino group.

7. A nuclear non-sulfonated azo compound having the general formula:

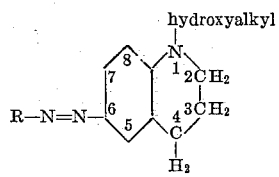

wherein R represents an aryl nucleus of the benzene series containing but one benzene ring and wherein at least one of the positions designated 5 and 7 is substituted with an acylamino group.

8. The azo dye compounds having the general formula:

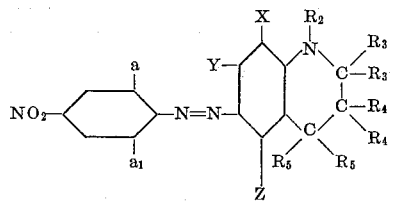

wherein $a$ and $a_1$ each represents a member selected from the group consisting of hydrogen, nitro, halogen, alkyl, alkoxy, alkyl sulfone, sulfonamide, hydroxy, carboxy, cyano and alkylketo, $R_2$ represents a member selected from the group consisting of hydrogen, an alkyl group, a short chain unsaturated hydrocarbon group, a cycloalkyl group, a phenyl group and a furyl group, $R_3$, $R_4$ and $R_5$ each represents a member selected from the group consisting of hydrogen, an alkyl group, an alkoxy group and a hydroxy group, Y represents a member selected from the group consisting of hydrogen and an acylamino group, X and Z each represents a member selected from the group consisting of hydrogen, a halogen atom, a hydroxy group, an alkyl group, an alkoxy group and an amino group and wherein at least one of the members Y and Z must be an acylamino group.

9. The azo compound having the formula:

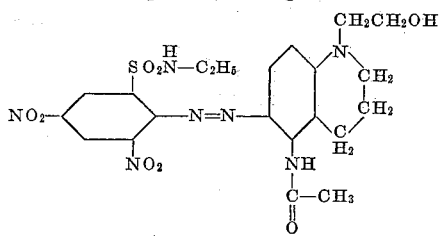

10. The azo compound having the formula:

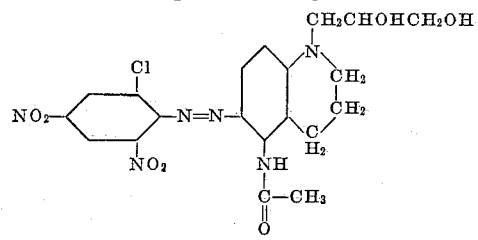

11. The azo compound having the formula:

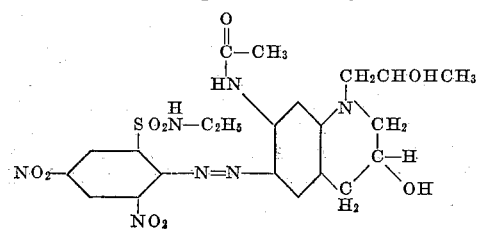

12. Material selected from the group consisting of an organic derivative of cellulose, cotton, wool, silk and viscose colored with an azo compound having the general formula:

$$R-N=N-R_1$$

wherein R represents the residue of a member selected from the group consisting of an aryl nucleus of the benzene series and an aryl nucleus of the naphthalene series, $R_1$ represents the residue of a tetrahydroquinoline nucleus containing an acylamino group in a position selected from the group consisting of the 5 and 7 positions and wherein said tetrahydroquinoline nucleus is joined through its 6 position to the azo bond shown.

13. Material selected from the group consisting of an organic derivative of cellulose, cotton, wool, silk and viscose colored with an azo compound having the general formula:

$$R-N=N-R_1$$

wherein R represents the residue of a member selected from the group consisting of an aryl nucleus of the benzene series and an aryl nucleus of the naphthalene series, $R_1$ represents the residue of a tetrahydroquinoline nucleus containing an acetylamino group in a position selected from the group consisting of the 5 and 7 positions and wherein said tetrahydroquinoline nucleus is joined through its 6 position to the azo bond shown.

14. An organic derivative of cellulose textile material colored with a nuclear non-sulfonated azo compound having the general formula:

$$R-N=N-R_1$$

wherein R represents the residue of a member selected from the group consisting of an aryl nucleus of the benzene series and an aryl nucleus of the naphthalene series, $R_1$ represents the residue of a tetrahydroquinoline nucleus containing an acylamino group in a position selected from the group consisting of the 5 and 7 positions and wherein said tetrahydroquinoline nucleus is joined through its 6 position to the azo bond shown.

15. An organic derivative of cellulose textile material colored with a nuclear non-sulfonated azo compound having the general formula:

$$R-N=N-R_1$$

wherein R represents the residue of an aryl nucleus of the benzene series containing but one benzene ring, $R_1$ represents the residue of a tetrahydroquinoline nucleus containing an acylamino group in a position selected from the group consisting of the 5 and 7 positions and wherein said tetrahydroquinoline nucleus is joined through its 6 position to the azo bond shown.

16. A cellulose acetate textile material colored with a nuclear non-sulfonated azo compound having the general formula:

$$R-N=N-R_1$$

wherein R represents the residue of a member selected from the group consisting of an aryl nucleus of the benzene series and an aryl nucleus of the naphthalene series, $R_1$ represents the residue of a tetrahydroquinoline nucleus containing an acylamino group in a position selected from the group consisting of the 5 and 7 positions and wherein said tetrahydroquinoline nucleus is joined through its 6 position to the azo bond shown.

17. A cellulose acetate textile material colored with a nuclear non-sulfonated azo compound having the general formula:

R—N=N—R₁ wherein R represents the residue of an aryl nucleus of the benzene series containing but one benzene ring, R₁ represents the residue of a tetrahydroquinoline nucleus containing an acylamino group in a position selected from the group consisting of the 5 and 7 positions and wherein said tetrahydroquinoline nucleus is joined through its 6 position to the azo bond shown.

18. A cellulose acetate textile material colored with a nuclear non-sulfonated azo compound having the general formula:

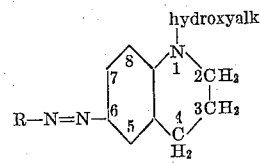

wherein R represents an aryl nucleus of the benzene series containing but one benzene ring and wherein at least one of the positions designated 5 and 7 is substituted with an acylamino group.

JAMES G. McNALLY.
JOSEPH B. DICKEY.